(12) United States Patent
Kato

(10) Patent No.: US 12,377,655 B2
(45) Date of Patent: Aug. 5, 2025

(54) LIQUID EJECTION HEAD AND CLEANING METHOD

(71) Applicant: CANON KABUSHIKI KAISHA, Tokyo (JP)

(72) Inventor: Maki Kato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 170 days.

(21) Appl. No.: 18/100,106

(22) Filed: Jan. 23, 2023

(65) Prior Publication Data

US 2023/0234357 A1    Jul. 27, 2023

(30) Foreign Application Priority Data

Jan. 26, 2022  (JP) ................. 2022-010083

(51) Int. Cl.
*B41J 2/045*     (2006.01)
*B41J 2/14*      (2006.01)
*B41J 2/165*     (2006.01)
*G01N 27/30*     (2006.01)

(52) U.S. Cl.
CPC ............. *B41J 2/165* (2013.01); *B41J 2/0452* (2013.01); *B41J 2/04541* (2013.01); *B41J 2/0458* (2013.01); *B41J 2/04591* (2013.01); *B41J 2/1404* (2013.01); *B41J 2/14072* (2013.01); *B41J 2/14129* (2013.01); *G01N 27/30* (2013.01); *B41J 2/16532* (2013.01); *B41J 2002/16573* (2013.01); *B41J 2202/12* (2013.01); *B41J 2202/18* (2013.01)

(58) Field of Classification Search
CPC ...... B41J 2/165; B41J 2/0452; B41J 2/04541; B41J 2/0458; B41J 2/04591; B41J 2/14072; B41J 2/14129; B41J 2202/12; B41J 2202/18; B41J 2/1404; B41J 2/16532; B41J 2002/16573; G01N 27/30
See application file for complete search history.

(56) References Cited

U.S. PATENT DOCUMENTS

| | | | |
|---|---|---|---|
| 7,950,769 B2 | 5/2011 | Sakai et al. | |
| 9,114,612 B2 | 8/2015 | Kato et al. | |
| 9,308,722 B2 | 4/2016 | Ishida et al. | |
| 9,498,956 B2 | 11/2016 | Kato et al. | |
| 9,682,552 B2 | 6/2017 | Kato et al. | |
| 2020/0114643 A1* | 4/2020 | Kato | B41J 2/14129 |

FOREIGN PATENT DOCUMENTS

| | | | | |
|---|---|---|---|---|
| JP | 2008105364 A | * | 5/2008 | .......... B41J 2/14072 |
| JP | 2009000853 A | * | 1/2009 | ................ B41J 2/16 |
| JP | 2015-221498 A | | 12/2015 | |

* cited by examiner

*Primary Examiner* — Yaovi M Ameh
(74) *Attorney, Agent, or Firm* — Venable LLP

(57) ABSTRACT

A technique capable of appropriately detecting a timing for replacement of a liquid ejection head is provided. The liquid ejection head includes a first electrode configured to protect an electrothermal conversion element that ejects a liquid from an ejection port and to be capable of eluting into the liquid by an electrochemical reaction with the liquid; and a second electrode installed so as to be electrically connectable to the first electrode via the liquid. A voltage is applied to cause the second electrode to generate the electrochemical reaction with the first electrode so that the first electrode is eluted into the liquid. Polarities can be reversed between the first electrode and the second electrode for applying the voltage, and wiring resistance in a circuit including a plurality of second electrodes as a part of wiring can be measured.

13 Claims, 10 Drawing Sheets

LIQUID EJECTION HEAD AND CLEANING METHOD

BACKGROUND OF THE INVENTION

Field of the Invention

The present invention relates to a liquid ejection head that can be widely applied as a print head capable of ejecting ink in an inkjet system, for example, and to a cleaning method for the liquid ejection head.

Description of the Related Art

Regarding a liquid ejection head with a system in which a voltage is applied to a heating resistance element to cause film boiling in a liquid so that the liquid is ejected by the growth energy of bubbles, in a case of ejecting a liquid such as ink containing a coloring material, the occurrence of kogation is a problem. Kogation represents a phenomenon in which an ink component with thermal solubility decomposes, denatures, or the like, due to heat generated by a heating resistance element, so as to adhere as kogation to the heating resistance element or a coating film covering the surface of the heating resistance element. The occurrence of kogation lowers the thermal conductivity from the heating resistance element to the liquid and causes unstable bubbling and thus unstable ejection operations.

Japanese Patent Laid-Open No. 2008-105364 discloses a technique in which the surface of an upper protective layer of a heating resistance element is configured of a material that can elute into a liquid by an electrochemical reaction, and a positive potential is applied to the material to cause the material to elute into the liquid for removing kogation. In order to maintain such a function of removing kogation, regarding a material layer formed of the above-described material, it is necessary to manage the elution amount of the above-described material due to removal of kogation, so that the liquid ejection head can be replaced if the remaining amount of the material layer falls below a specified value due to the elution of the above-described material into the liquid.

Japanese Patent Laid-Open No. 2015-221498 discloses a technique in which, even if the conductivity of the liquid, i.e., especially ink, varies during cleaning, the elution amount of the above-described material layer can be ascertained by measuring the conductivity of the liquid before the cleaning to determine conditions for the cleaning.

Although it is possible to manage the elution amount of the material configuring the material layer with the technique disclosed in Japanese Patent Laid-Open No. 2015-221498, it is not possible to directly manage the material layer, such as by measuring the film thickness of the material layer. By the way, in the manufacturing process of a liquid ejection head, process variations such as film thickness distribution during film formation and film reduction distribution due to the back-end process occur within a wafer or between wafers. Therefore, the manufactured liquid ejection head has variations in the initial film thickness of the above-described material layer. Therefore, in the technique disclosed in Japanese Patent Laid-Open No. 2015-221498, the number of times of cleaning, which is used as an indicator of the timing for replacement of the liquid ejection head, is determined on the assumption of the minimum film thickness of the material layer according to process variations.

Specifically, the manufacturing tolerance of the material layer is, for example, 10 nm or more, and the amount of film reduction due to one cleaning process is, for example, several nm. In this case, if the liquid ejection head configured with an average film thickness reaches the number of times of cleaning determined in consideration of process variations, the liquid ejection head needs to be replaced even though several more cleaning processes can be performed.

SUMMARY OF THE INVENTION

The present invention has been made in view of the above-described problems and provides a technique capable of appropriately detecting a timing for replacement of a liquid ejection head.

In the first aspect of the present invention, there is provided a liquid ejection head including:
an ejection port configured to eject a liquid stored in a liquid chamber;
an electrothermal conversion element configured to eject the liquid from the ejection port by heat generation;
a first electrode configured to protect the electrothermal conversion element and to be capable of eluting into the liquid by an electrochemical reaction with the liquid; and
a second electrode installed so as to be electrically connectable to the first electrode via the liquid,
wherein a voltage is applied to cause the second electrode to generate the electrochemical reaction with the first electrode, so that the first electrode is eluted into the liquid,
wherein polarities can be reversed between the first electrode and the second electrode for applying the voltage, and
wherein wiring resistance in a circuit including a plurality of second electrodes as a part of wiring can be measured.

In the second aspect of the present invention, there is provided a liquid ejection head including:
an ejection port configured to eject a liquid stored in a liquid chamber;
an electrothermal conversion element configured to eject the liquid from the ejection port by heat generation;
a first electrode configured to protect the electrothermal conversion element and to be capable of eluting into the liquid by an electrochemical reaction with the liquid; and
a second electrode installed so as to be electrically connectable to the first electrode via the liquid,
wherein a voltage is applied to cause the second electrode to generate the electrochemical reaction with the first electrode, so that the first electrode is eluted into the liquid, and
wherein wiring resistance in a circuit including a plurality of first electrodes as a part of wiring can be measured.

In the third aspect of the present invention, there is provided a cleaning method for a liquid ejection head including:
a first electrode configured to protect an electrothermal conversion element that ejects a liquid in a liquid chamber from an ejection port by head generation and to be capable of eluting into the liquid by an electrochemical reaction with the liquid; and
a second electrode configured to be capable of eluting into the liquid by an electrochemical reaction with the liquid and installed so as to be electrically connectable to the first electrode via the liquid, wherein a voltage is applied to cause the second electrode to generate the electrochemical reaction with the first electrode, so that the first electrode is eluted into the liquid, and thus kogation originating from the liquid adhering to the first electrode is removed, the cleaning method including:

measuring a resistance value in at least one of a circuit including a plurality of first electrodes as a part of wiring and a circuit including a plurality of second electrodes as a part of wiring; and determining whether or not kogation on the first electrode can be removed, based on the measured resistance value.

According to the present invention, it is possible to appropriately detect a timing for replacement of a liquid ejection head.

Further features of the present invention will become apparent from the following description of exemplary embodiments with reference to the attached drawings.

DESCRIPTION OF THE EMBODIMENTS

Hereinafter, an example of embodiments of a liquid ejection head and a cleaning method is explained in detail with reference to the accompanying drawings. Note that the following embodiments are not intended to limit the present invention, and every combination of the characteristics explained in the embodiments is not necessarily essential to the solution in the present invention. Further, unless otherwise specified, the relative positions, shapes, etc., of the constituent elements described in the embodiments are merely examples and are not intended to limit the range of the present invention to those examples.

(Configuration of the Printing Apparatus)

Figure 1:
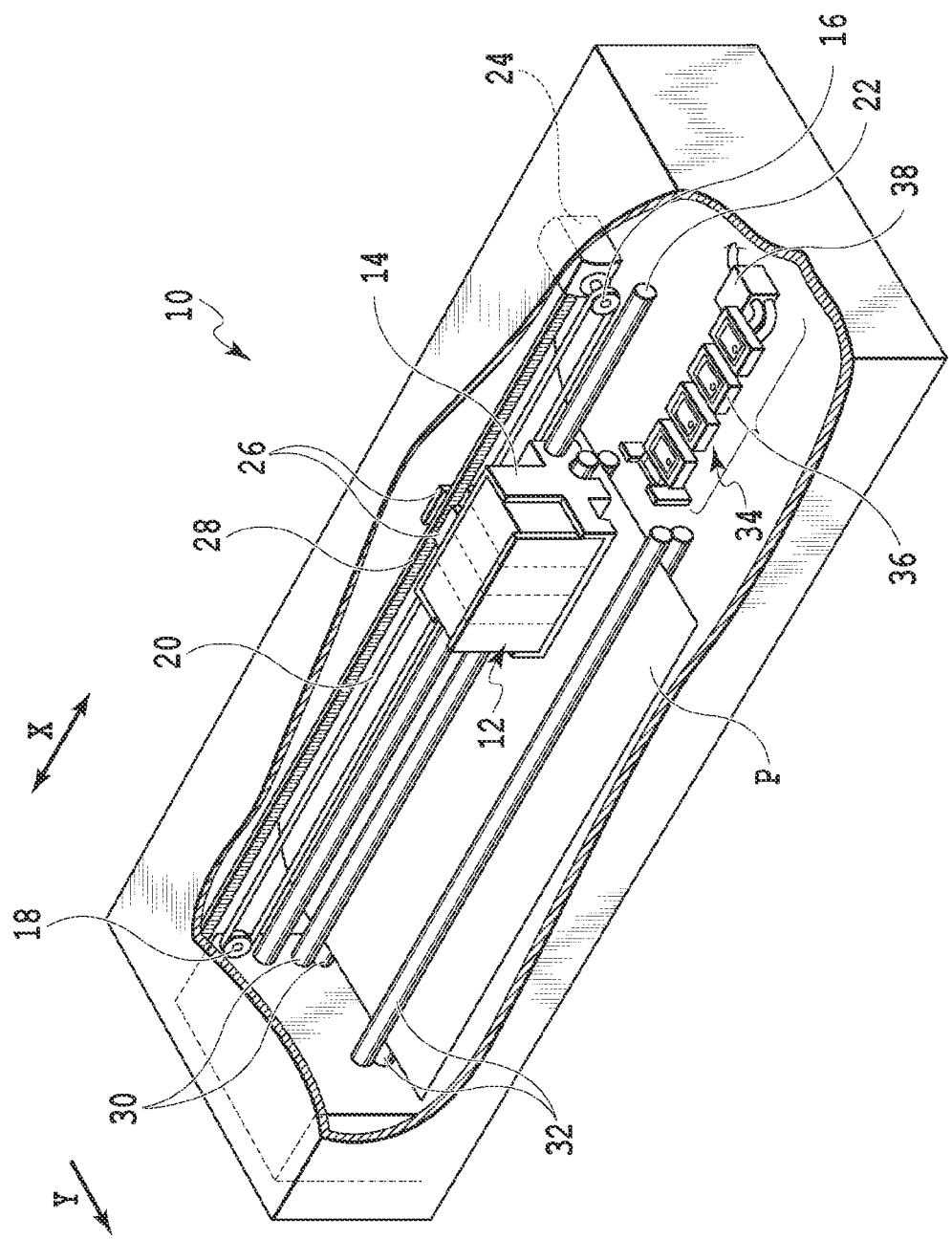
FIG. 1 is a schematic configuration view of a printing apparatus which serves as a liquid ejection apparatus.
Figure 2:
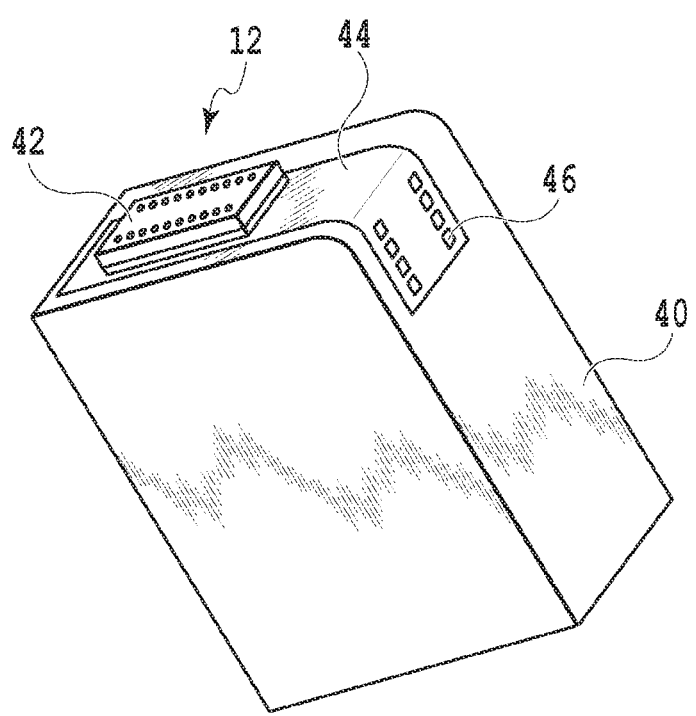
FIG. 2 is a perspective configuration view of ahead unit.
Figure 3:
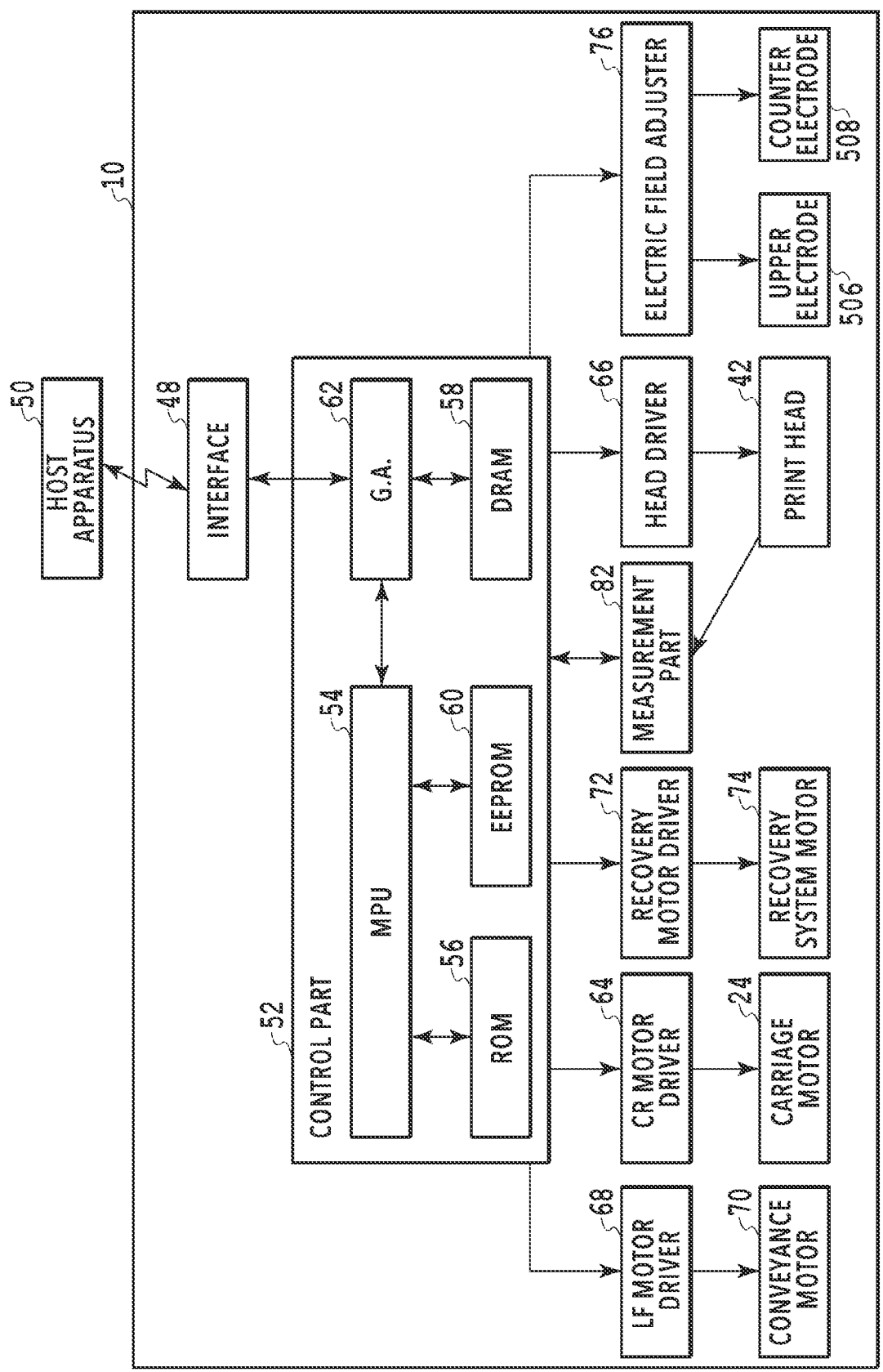
FIG. 3 is a block configuration view of a control system of the printing apparatus.

First, a configuration of a liquid ejection apparatus equipped with a liquid ejection head according to the present embodiment is explained. Note that, in the specification of the present application, an inkjet printing apparatus (hereinafter referred to as a "printing apparatus") that ejects ink onto a print medium for printing is taken as an example of the liquid ejection apparatus for the sake of explanation. Therefore, in this printing apparatus, a print head that ejects ink for printing corresponds to a liquid ejection head that ejects liquid. FIG. 1 is a schematic configuration view in which a part of the printing apparatus equipped with the print head according to the present embodiment is cut off for the sake of illustration. FIG. 2 is a perspective configuration view of a head unit. FIG. 3 is a block view illustrating a configuration of a control system of the printing apparatus.

The printing apparatus 10 includes the carriage 14 with the removable head unit 12. The carriage 14 is attached to the endless belt 20 stretched over the drive pulley 16 and the driven pulley 18. Further, the carriage 14 is installed in a slidable manner on the guide shaft 22 which is installed so as to be parallel to the extending direction of the belt 20. If the drive pulley 16 whose driving source is the carriage motor 24 rotates, the belt 20 rotates, and the carriage 14 moves in the arrow X direction while being supported by the guide shaft 22. Therefore, the carriage 14 is configured to be capable of reciprocating in the arrow X direction according to the rotation direction of the drive pulley 16.

The printing apparatus 10 has the encoder sensor 26. The encoder sensor 26 detects a slit of the linear scale 28 which extends in the X direction. The control part 52 (described later) of the printing apparatus 10 detects the position of the carriage 14 in the X direction, based on a detection result of the encoder sensor 26 on the linear scale 28.

The printing apparatus 10 includes the conveyance roller pairs 30 and 32. The conveyance roller pairs 30 and 32 are rotated by the conveyance motor 70 (see FIG. 3) to convey the print medium P in the arrow Y direction. The conveyance roller pair 30 is located on the upstream side in the Y direction, which is the conveyance direction of the print medium P, and the conveyance roller pair 32 is located on the downstream side in the Y direction. With respect to the Y direction, the conveyance roller pairs 30 and 32 are located so as to sandwich the area to which ink is ejected by the head unit 12. Further, by conveying the print medium P while nipping the print medium P, the conveyance roller pairs 30 and 32 maintain the smoothness of the position of the print medium P facing the print head 42 (described later) in the head unit 12.

Further, the printing apparatus 10 performs a printing operation, in which ink is ejected to the print medium P by the print head 42 of the head unit 12 according to print data, based on a detection result of the encoder sensor 26, while the carriage motor 24 is driven by the control part 52. Accordingly, an image corresponding to one band is printed on the print medium P. Thereafter, the control part 52 drives the conveyance motor 70 so as to perform a conveyance operation for conveying the print medium P in the arrow Y direction by the distance corresponding to one band. The printing apparatus 10 forms printed images on the print medium P by alternately and repeatedly executing the printing operation and the conveyance operation as such.

Further, the printing apparatus 10 includes the recovery unit 34 for performing maintenance on the print head 42 of the head unit 12 at the home position located at one end in the X direction. The recovery unit 34 includes the cap member 36 for protecting the print head 42, the pump 38 for generating negative pressure in the cap member 36 by suctioning, etc.

Four head units 12 are arranged in the carriage 14 and are configured to be capable of ejecting cyan, magenta, yellow, and black inks, respectively. Each head unit 12 includes the tank 40 containing ink therein and the print head 42 for ejecting the ink contained in the tank (see FIG. 2). Further, the head units 12 include the wiring tape 44 for supplying print data, power, etc., to the print head 42. The wiring tapes 44 are formed with the contacts 46 for electrical connection with the main body of the printing apparatus 10 at the time when the head units 12 are mounted on the carriage 14.

Note that, regarding the printing apparatus 10, although the present embodiment has a form of using the head unit 12 in which the tank 40 and the print head 42 are integrated, there is not a limitation as such. That is, such a form in which the tank 40 and the print head 42 are separated is also possible. Specifically, a print head is installed on the carriage 14, and ink is supplied to the print head via a tube or the like from a tank removably installed in the printing apparatus 10. In this case, it is possible to install a print head for each color, and it is also possible to install only one print head capable of ejecting four inks. Note that the number of inks used in the printing apparatus 10 and the type of liquid to be ejected are not limited to those described above. That is, the number of inks may be one, two, three, or five or more, and the type of liquid may be treatment liquid that is used to perform a predetermined process on the print medium P or the like, other than ink.

Next, with reference to FIG. 3, the configuration of a control system of the printing apparatus 10 is explained. The printing apparatus 10 is connected via the interface (I/F) 48 to the host apparatus 50, which is installed separately. The printing apparatus 10 transmits and receives various kinds of information to and from the host apparatus 50 via this I/F 48. Specifically, the printing apparatus 10 receives print commands and image data from the host apparatus 50 and transmits status information of the printing apparatus 10 to the host apparatus 50 via the I/F 48. As the host apparatus 50, other than general-purpose personal computers, publicly-known apparatuses such as digital cameras, scanners, and mobile terminals can be used. If a print command is generated in the host apparatus 50, the print command is input to the printing apparatus 10 via the I/F 48 together with image data.

The overall operation of the printing apparatus 10 is controlled by the control part 52. The control part 52 includes the MPU 54, the ROM 56, the DRAM 58, the EEPROM 60, and the gate array (GA) 62. The EEPROM 60 is a memory in which various information necessary for the printing apparatus 10 next time the power is turned on is recorded even in a state where the power is turned off. Further, the GA 62 performs data transfer control with the I/F 48 under an instruction of the MPU 54.

The MPU 54 performs various processes according to programs and parameters stored in the ROM 56 while using the DRAM 58 as a work area. For example, the MPU 54 drives the carriage motor 24 via the CR motor driver 64 connected to the control part 52 to move the carriage 14 in the X direction. In the printing operation, at this time, print data is transferred from the DRAM 58 to the print head 42 via the head driver 66 connected to the control part 52, so that an image corresponding to one band is printed by the print head 42.

Further, the MPU 54 drives the conveyance motor 70 via the LF motor driver 68 connected to the control part 52 each time an image corresponding to one band is printed, so that the conveyance roller pairs 30 and 32 convey the print medium P by a predetermined distance in the Y direction. By the MPU 54 alternately repeating the printing operation, which is performed by controlling the carriage motor 24 and the print head 42, and the conveyance operation, which is performed by controlling the conveyance roller pairs 30 and 32, the image data received from the host apparatus 50 is printed on the print medium P.

Furthermore, the MPU 54 drives the recovery system motor 74 via the recovery motor driver 72 connected to the control part 52 at a timing such as after the printing of an image corresponding one page ends, so that the suction recovery process for the print head 42 is executed. That is, the recovery system motor 74 includes a motor that drives the pump 38 and a motor that elevates and lowers the cap member 36, for example.

Further, the MPU 54 adjusts the potentials of the upper electrode 506 and the counter electrode 508 installed in the print head 42 via the electric field adjuster 76 connected to the control part 52. Further, the measurement part 82 (the measurement parts 82-1 and 82-2, which are described later) measures the resistance value in a circuit including multiple upper electrodes 506 or multiple counter electrodes 508 as a part of its wiring in the head unit 12 (the print head 42) and outputs the measurement result to the control part 52. Note that the upper electrode 506 and the counter electrode 508 are described later.

In the ROM 56, various parameters to be used by the MPU 54 for performing various controls are stored. Such parameters include, for example, the shape of the voltage pulse to be applied to heating resistance elements of the print head 42, the current value and timing of the current to be applied to the upper electrode 506 and the counter electrode 508, the conveyance speed of the print medium P, the movement speed of the carriage 14, etc.

(Configuration of the Print Head)

Figure 4:
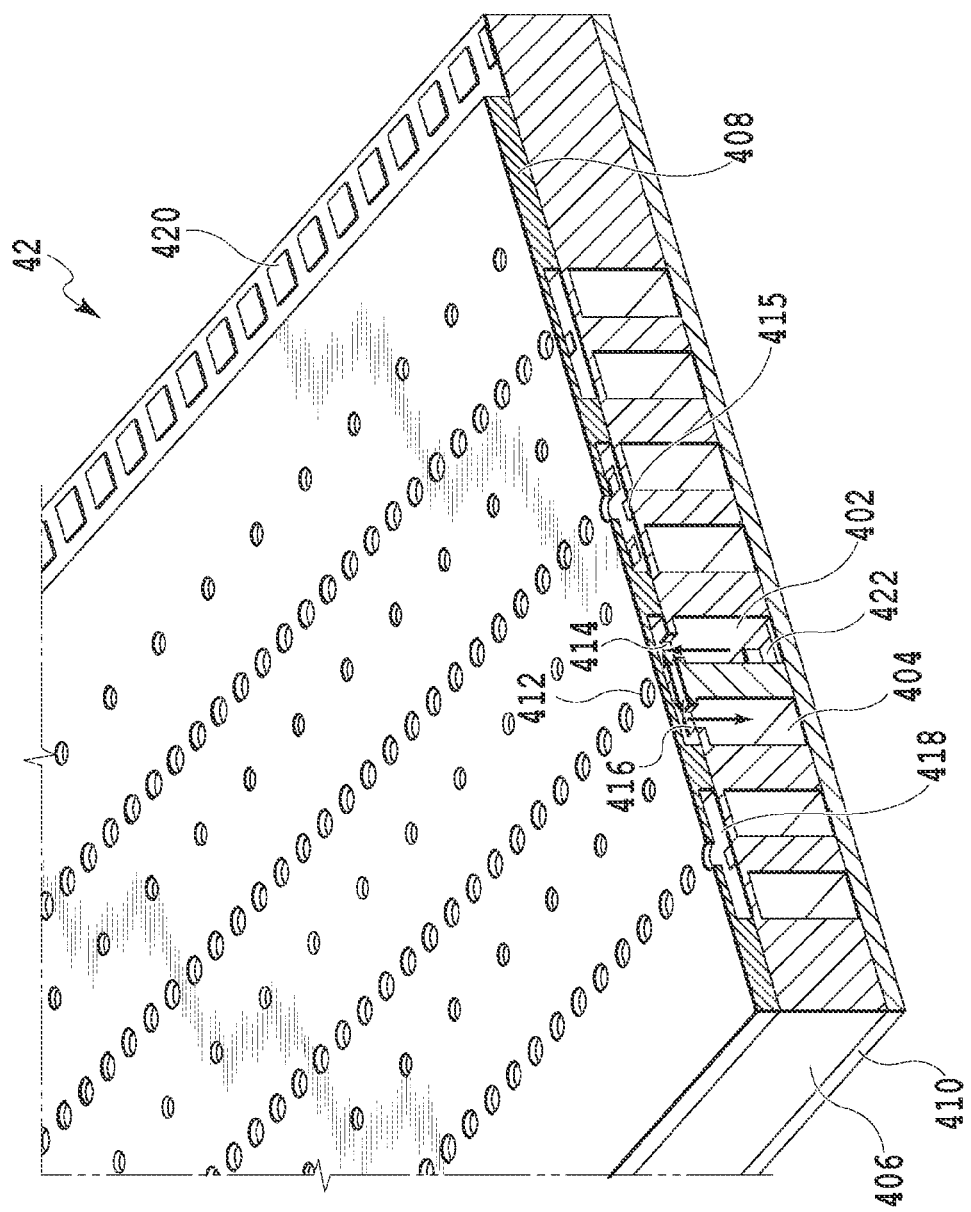
FIG. 4 is a schematic configuration view of a print head.
Figure 5A:
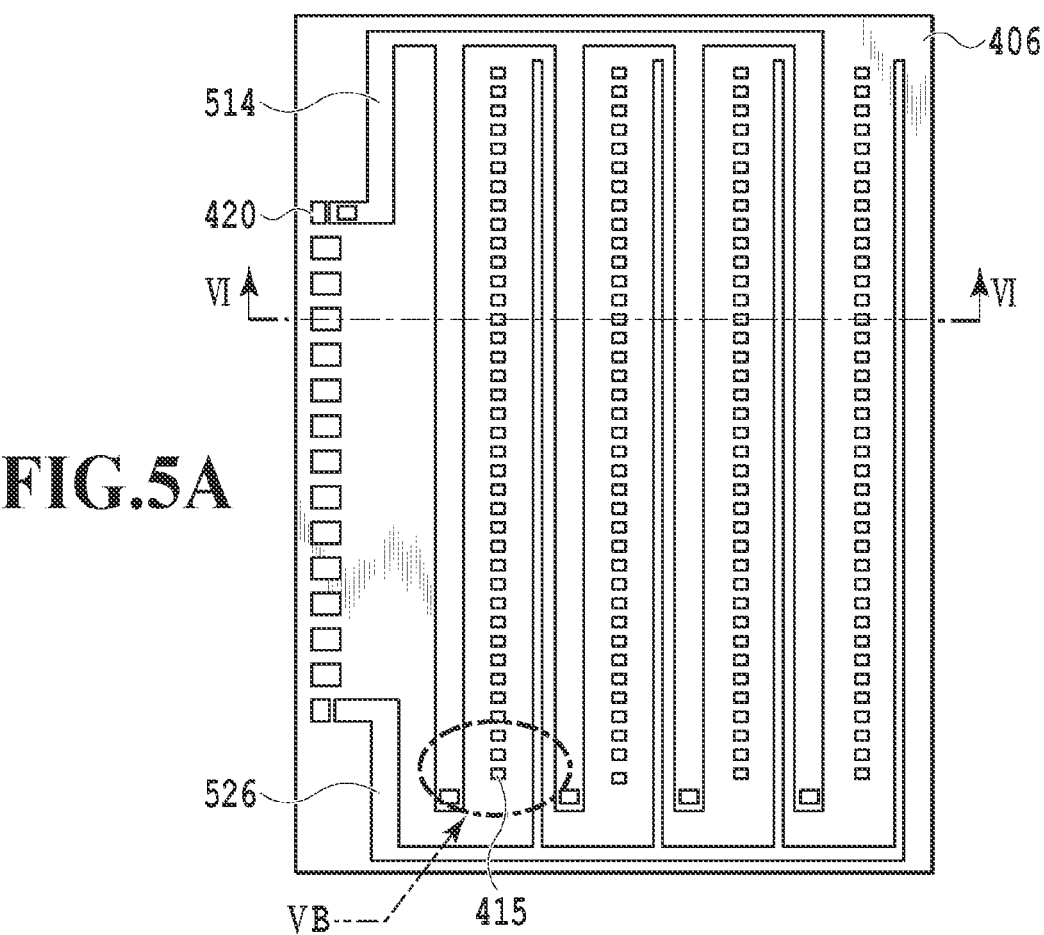
FIG. 5A and FIG. 5B are diagrams for explaining a detailed configuration of the print head.
Figure 5B:
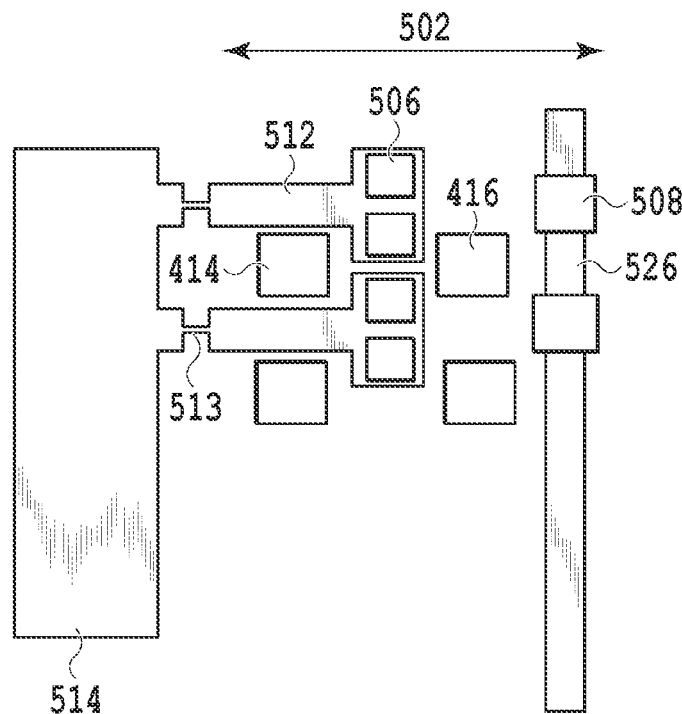
Figure 10A:
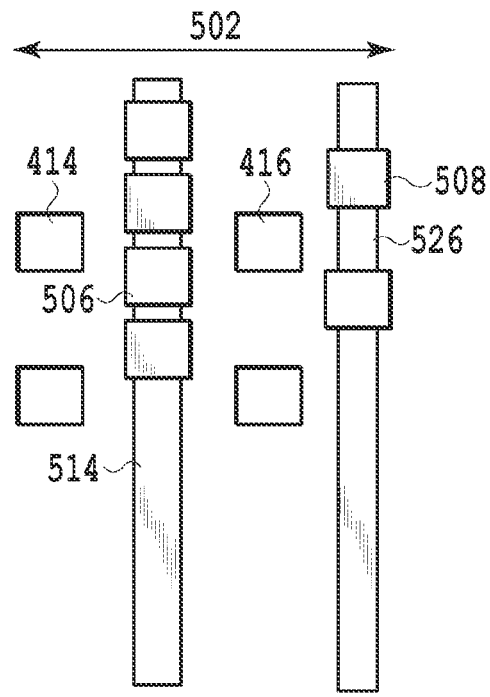
FIG. 10A and FIG. 10B are diagrams illustrating modification examples of common wiring of respective electrodes.
Figure 10B:
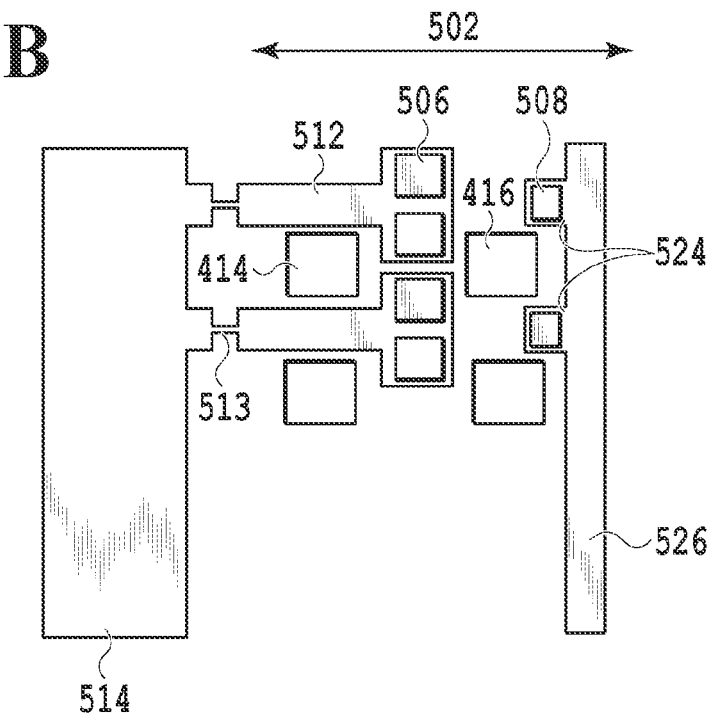

Next, the configuration of the print head is explained. FIG. 4 is a schematic perspective configuration view of the print head according to the present embodiment. FIG. 5A is a plan view schematically illustrating a configuration of a base plate. FIG. 5B is an enlarged view in the frame VB of FIG. 5A FIGS. 10A and 10B are modification examples of the circuit configuration of the frame VB portion of FIG. 5B. FIG. 10A is a modification example of the common wiring 514, and FIG. 10B is a modification example of the common wiring 526.

The print head 42 includes the print head base plate (hereinafter also simply referred to as the "base plate") 406 on which the ink supply channel 402 for supplying ink to the pressure chamber 418 (described later) and the ink collection channel 404 for collecting ink from the pressure chamber 418 are formed. One surface of this base plate 406 is equipped with the channel forming member 408 formed with an ejection port array of the multiple ejection ports 412 for ejecting ink. Further, the cover plate 410 is formed on the other surface facing the one surface of the base plate 406.

The ink supply channel 402 and the ink collection channel 404 extend along the extending direction of the ejection port arrays in the channel forming member 408. Further, on one surface of the base plate 406, an array of multiple supply ports 414 communicating with the ink supply channel 402 is arranged along the extending direction of an ejection port array. Furthermore, on one surface of the base plate 406, an array of multiple collection ports 416 communicating with the ink collection channel 404 is arranged along the extending direction of an ejection port array.

On one surface of the base plate 406, the thermal action part 415 for bubbling the ink with thermal energy is formed at a position corresponding to the ejection port 412. This thermal action part 415 includes the printing element (also referred to as the "heating resistance element" or the "electrothermal conversion element" in the following explanation) 610 (see FIG. 6) for performing printing by ejecting ink and the upper electrode 506 (described later) that protects the heating resistance element 610. The thermal action part 415 is positioned inside the pressure chamber 418 formed in the channel forming member 408.

Further, the terminal 420 to be electrically connected to the heating resistance element 610 by electric wiring (not illustrated in the drawings) installed on the base plate 406 is formed on one surface of the base plate 406. Therefore, the heating resistance element 610 generates heat, based on a pulse signal which is input via an external wiring base plate (not illustrated in the drawings), to boil the ink inside the pressure chamber 418. The ink is ejected from the ejection port 412 by the force of bubbling caused by this boiling.

The cover plate 410 is equipped with the opening 422 communicating with the ink supply channel 402 and an opening (not illustrated in the drawings) communicating with the ink collection channel 404. Ink is supplied to the print head 42 from this opening 422, and ink is collected from the print head 42 via the opening communicating with the ink collection channel 404. Therefore, in the print head 42, ink is supplied to the pressure chamber 418 through the opening 422, the ink supply channel 402 and the supply port 414. Further, the ink supplied to the pressure chamber 418 is collected through the collection port 416, the ink collection channel 404, and the opening communicating with the ink collection channel 404.

In the channel forming member 408, the liquid chamber 502 (see FIG. 5B), which is a space that includes the pressure chamber 418 and stores ink together with the base plate 406, is formed. In this liquid chamber (inside the liquid chamber 502), the upper electrode 506 is installed so as to cover the heating resistance element 610 in the thermal action part 415. The upper electrode 506 is formed of a material that can elute into ink by an electrochemical reaction. As described above, the upper electrode 506 is installed at an upper part of a heating resistance element on the side of the base plate 406 that comes into contact with the ink. Further, in the liquid chamber 502, the counter electrode 508 (the second electrode) is installed so as to correspond to the upper electrode 506 (the first electrode). Note that this counter electrode 508 is an electrode for causing an electrochemical reaction between the upper electrode 506 and the ink so as to elute the upper electrode 506 into the ink. Note that the counter electrode 508 is formed using the same material as the upper electrode 506, for example.

As described in detail later, the upper electrode 506 is connected to the terminal 516 (see FIG. 8) via the common wiring 514 for upper electrodes, so that a potential is applied from the outside through the terminal 516. Further, the counter electrode 508 is connected to the terminal 528 (see FIG. 8) via the common wiring 526 for counter electrodes, so that a potential is applied from the outside via the terminal 528. Thereby, a voltage can be applied to the upper electrode 506 and the counter electrode 508 via the ink in the liquid chamber 502.

The upper electrode 506 and the counter electrode 508 are configured of a conductive material. Note that, as described in detail later, the layer exposed to the ink in the protective layer 616 (see FIG. 6) which protects the heating resistance element 610 functions as the upper electrode 506. The areas of the upper electrode 506 and counter electrode 508 being in contact with the ink may have the same size, or that of the counter electrode 508 may be smaller. Further, the numbers of installed upper electrodes 506 and counter electrodes 508 may be the same, or the number of counter electrodes 508 may be less. Note that, in recent years, with improvement of the image quality of printing, the area of the liquid chamber 502 has become smaller, and the space in which the counter electrode 508 can be arranged has also become smaller. Therefore, the area of the counter electrode 508 tends to be small.

Furthermore, as described in detail later, the common wiring 514 connecting the upper electrodes 506 forms the circuit 802 (described later) together with the terminal 516, the multiple upper electrodes 506, and the terminal 520. Note that, in the circuit 802 (see FIG. 8), the terminal 520 is arranged on the opposite side of the terminal 516 in the common wiring 514 to which the upper electrodes 506 are connected, that is, the terminal 520 is arranged in the common wiring 514 so as to sandwich the multiple upper electrodes 506 and the terminal 516. Further, on the base plate 406, as in FIG. 5B, for example, the common wiring 514 is connected via the fuse part 513 to the individual wiring 512 which is connected to the two upper electrodes 506. The circuit 802 is capable of measuring wiring resistance (see FIG. 8). Specifically, the circuit 802 is equipped with the measurement part 82-1 capable of measuring wiring resistance (see FIG. 8). Therefore, in FIG. 5B, the circuit 802 is configured to include the terminal 516, the terminal 520, the common wiring 514, the fuse part 513, the individual wiring 512, the multiple upper electrodes 506, and the measurement part 82-1. Note that the connection between the common wiring 514 and the upper electrodes 506 is not limited to such a form as in FIG. 5B. Specifically, the common wiring 514 may have such a form as in FIG. 10A, in which the multiple upper electrodes 506 are connected in series.

Further, the common wiring 526 connecting the counter electrodes 508 forms the circuit 806 (described later) together with the terminals 528, the terminal 532, and the multiple counter electrodes 508. Note that, in the circuit 806 (see FIG. 8), the terminal 532 is arranged on the opposite side of the terminal 528 in the common wiring 526, that is, the terminal 532 is arranged in the common wiring 526 so as to sandwich the multiple counter electrodes 508 and the terminal 528. Further, on the base plate 406, as in FIG. 5B, for example, the common wiring 526 connects the multiple counter electrodes 508 in series. Note that the circuit 806 also has a configuration capable of measuring wiring resistance. Specifically, the circuit 806 is equipped with the measurement part 82-2 capable of measuring wiring resistance (see FIG. 8). Therefore, in FIG. 5B, the circuit 806 is configured to include the terminal 538, the terminal 532, the common wiring 526, the multiple counter electrodes 508, and the measurement part 82-2. Note that the connection between the common wiring 526 and the counter electrodes 508 is not limited to such a form as in FIG. 5B. Specifically, as in FIG. 10B, each counter electrode 508 may be connected to the common wiring 526 via the individual wiring 524.

<Configuration of the Upper Electrode and the Counter Electrode>

Figure 6:
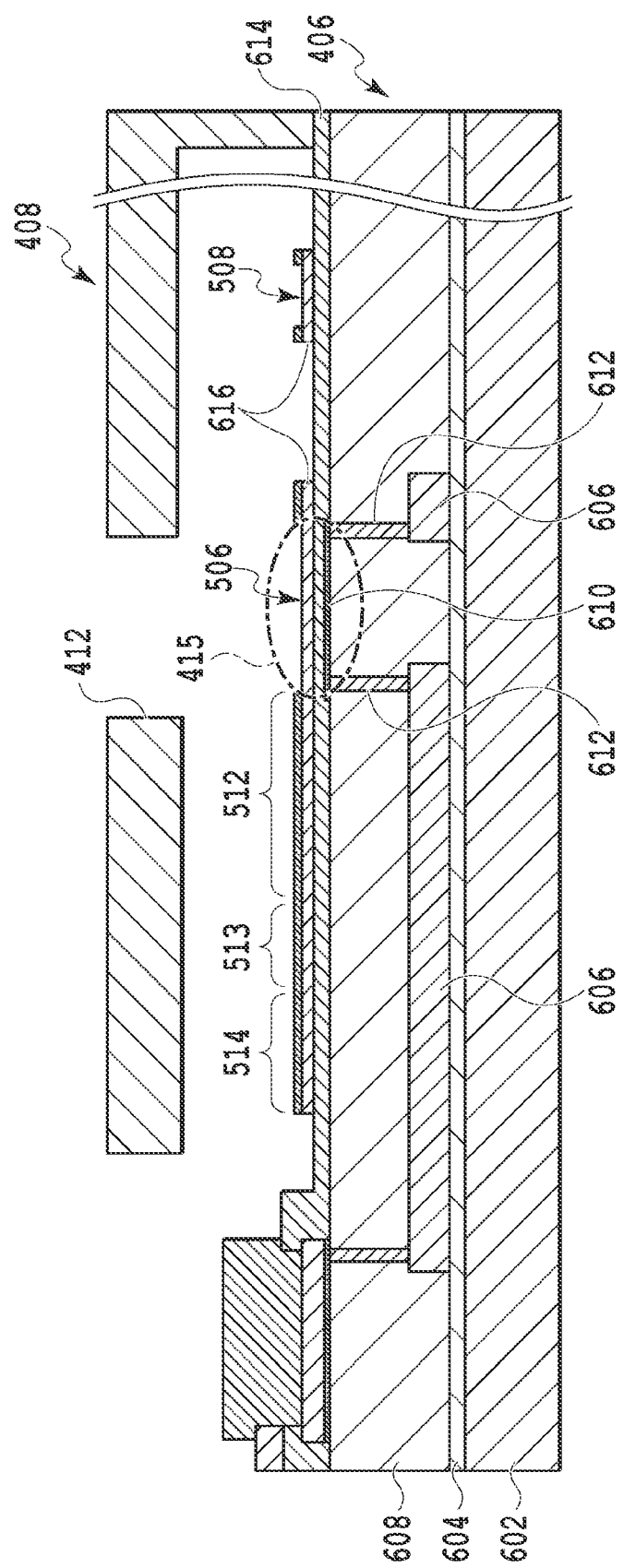
FIG. 6 is a cross-sectional configuration view of the vicinity of a heating resistance element in the print head.

Next, the multilayer structure of the heating resistance element, the upper electrode, and the counter electrode on the base plate is explained. FIG. 6 is a cross-sectional view at a position corresponding to line VI-VI of FIG. 5A illustrating the print head in which the channel forming member is formed. Although wiring is omitted for ease of understanding, the heating resistance element, the upper electrode, and the counter electrode installed on a substrate are electrically connected to wiring, respectively, for obtaining power necessary for the cleaning process for heat generation, kogation suppression, and kogation removal.

The base plate 406 on which drive elements (not illustrated in the drawings) and wiring for driving the drive elements (not illustrated in the drawings) are formed is equipped with the insulative layer 604 made of SiO on the upper surface of the silicon substrate (hereinafter also simply referred to as the "substrate") 602. Further, the first wiring pattern 606 made of an alloy of aluminum and copper is installed on the upper surface of the insulative layer 604. This first wiring pattern 606 is wiring for supplying a voltage to the heating resistance element 610.

The first wiring pattern 606 is covered with the insulative layer 608 made of SiO or the like. This insulative layer 608 is equipped with the plug 612 for connecting the first wiring pattern 606 and the heating resistance element 610. A material such as tungsten can be used for the plug 612. Further, the upper surface of the insulative layer 608 is a plane that is planarized by use of a CMP (Chemical Mechanical Polishing) method or the like.

The heating resistance element 610 is installed on the upper surface of the insulative layer 608. The heating resistance element 610 includes a heating resistor layer made of TaSiN or the like. The plug 612 is connected to this heating resistor layer. Further, in the heating resistor layer, the portion through which current flows via the plug 612 functions as the heating resistance element 610. Moreover, the second wiring pattern (not illustrated in the drawings) made of an alloy of aluminum and copper or the like is installed on the upper surface of the insulative layer 608. The second wiring pattern can be used to supply a voltage to the upper electrode 506 and the counter electrode 508.

The heating resistance element 610 and the second wiring pattern are covered with the insulative layer 614 made of SiN with a thickness of 20 nm, for example. The protective layer 616 is installed on the upper surface of the insulative layer 614. The protective layer 616 has, for example, a two-layer structure of a 30 nm iridium (Ir) layer (the lightly hatched layer in the drawing) and a 60 nm tantalum (Ta) layer (the darkly hatched layer in the drawing) which are laminated in this order from the insulative layer 614 side. Note that, in the portion of the protective layer 616 covering the region where the heating resistance element 610 is located, the tantalum layer, which is the upper layer, is removed so that the iridium layer is exposed in the pressure chamber 418. Note that this exposed iridium layer functions as the upper electrode 506. The heating resistance element 610 and the protective layer 616 are electrically insulated by the insulative layer 614.

Further, the individual wiring 512 and the common wiring 514 are installed on the upper surface of the insulative layer 614. It is also possible that the individual wiring 512 and the common wiring 514 are formed as the same layer using the same material as the protective layer 616. Although the fuse part 513 is installed between the individual wiring 512 and the common wiring 514 in the present embodiment, such a configuration is not necessarily required. In the present embodiment, the fuse part 513 is made of the same material and in the same layer as the individual wiring 512 and the common wiring 514.

Furthermore, the counter electrode 508 is installed on the upper surface of the insulative layer 614 so as to be spaced apart from the upper electrodes 506 in a direction intersecting the array direction of the upper electrodes 506. As with the upper electrodes 506, the counter electrode 508 is configured by laminating a 30 nm iridium layer and a 60 nm tantalum layer, and is formed by removing a part of the tantalum layer, which is the upper layer, so that the iridium layer is exposed in the pressure chamber 418. In the present embodiment, the counter electrode 508 is formed in the same layer as the upper electrodes 506. Further, although not illustrated in FIG. 6, the common wiring 526 is also formed in the same layer as the upper electrodes 506, the individual wiring 512, and the common wiring 514. Although the common wiring 514 and the common wiring 526 have the same configuration as the protective layer 616, it is also possible to use the second wiring pattern for routing by opening the insulative layer 614 and connecting to the second wiring pattern.

The upper electrode 506 is an electrode laminated so as to cover the heating resistance element 610 via the insulative layer 614. The upper electrode 506 functions as a negative electrode during printing primarily to repel the anions in the ink. Further, the upper electrode 506 has a function of protecting the heating resistance element 610 from physical and chemical impacts and also has thermal conductivity to instantaneously transfer the heat generated by the heating resistance element 610 to the ink. Further, the upper electrode 506 is formed of a material that does not form or hardly forms a strong oxide film with heating to about 700° C.

In the present embodiment, the potential of the upper electrode 506 is relatively higher than that of the counter electrode 508, so that the upper electrode 506 is eluted into the ink, and the kogation originating from the ink adhering to the upper electrode 506 is removed. The presence or absence of elution of metals due to electrochemical reactions can generally be ascertained from various potential-pH diagrams of metals.

The counter electrode 508 functions as a positive electrode during printing to keep the anions in the ink away from the upper electrode 506. For performing the cleaning process to remove the kogation formed on the upper electrode 506, the reaction that elutes the upper electrode 506 into the ink is continued by flowing a current from the upper electrode 506 toward the counter electrode 508 via the ink. Therefore, in order to stably maintain the current value to and from the upper electrode 506, it is preferable that a material with which an oxide film with low electrical conductivity is hardly formed is used for the counter electrode 508. Note that, in the specification of the present application, the removal of kogation formed on the upper electrode 506 is referred to as "cleaning" unless otherwise specified.

Further, during the operation of removing kogation from the upper electrode 506, that is, during the cleaning process, the polarities of the upper electrode 506 and the counter electrode 508 are reversed. Accordingly, the negatively charged particles attached to or attracted to the upper electrode 506 during the kogation removal operation can be released again into the ink, so that the kogation can be efficiently removed from the upper electrode 506. Here, as with the upper electrode 506, there is a concern that the counter electrode 508 itself also elutes into the ink due to the anodization reaction. However, even if the film thickness of the counter electrode 508 gradually decreases with an increase in the number of times of cleaning, no problem occurs as long as the original function is not impaired.

<Circuit Configuration>

Next, the circuit configuration including the upper electrode 506 and the counter electrode 508 is explained. In the present embodiment, the print head 42 is equipped with a circuit for suppressing the occurrence of kogation on the upper electrode 506 and removing the kogation formed on the upper electrode 506 and a circuit for detecting disappearance of the upper electrode 506 and the counter electrode 508.

=Circuit for Removing Kogation=

Figure 7:
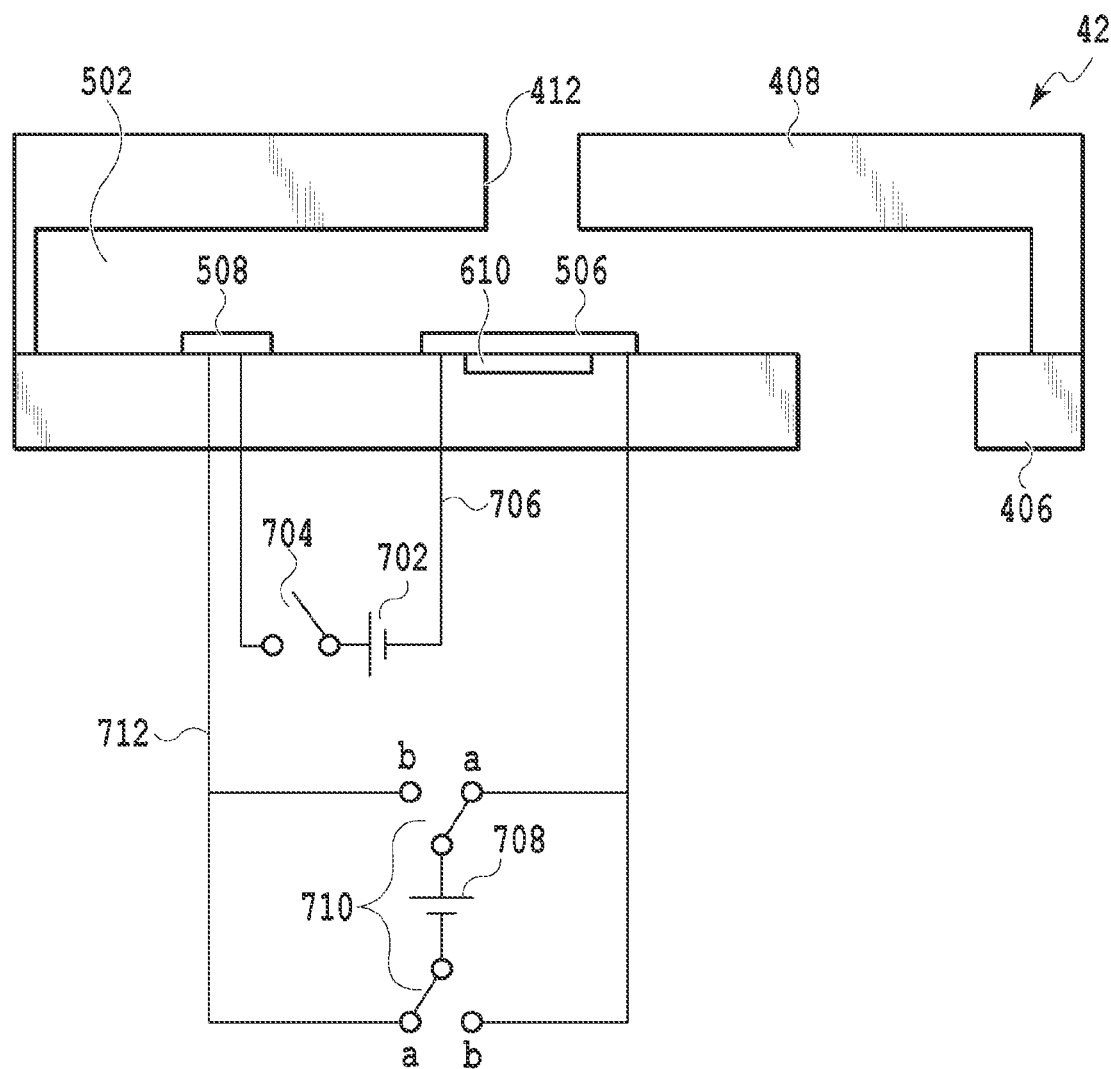
FIG. 7 is a diagram for explaining a circuit for suppressing and removing kogation.

First, the circuit for suppressing the occurrence of kogation on the upper electrode 506 and for removing the kogation formed on the upper electrode 506 is explained. FIG. 7 is a diagram illustrating the configuration of the circuit for suppressing the occurrence of kogation on an upper electrode and for removing the kogation formed on an upper electrode. Note that, in the illustration of FIG. 7, a part of the configurations on the base plate 406 is omitted for ease of understanding.

The upper electrode 506 and the counter electrode 508 are electrically connectable with the first circuit 706 which goes through the constant voltage power source 702 and the switch 704. Note that, in this first circuit 706, a closed circuit electrically connected by the ink in the liquid chamber 502 is formed. This first circuit 706 suppresses the occurrence of kogation on the upper electrode 506 during the printing operation. For example, the upper electrode 506, the counter electrode 508, and a part of the first circuit 706 are installed in the print head 42, and the remaining parts of the first circuit 706, the switch 704, and the constant voltage power source 702 are installed outside the print head 42. Note that it is also possible that the switch 704 is installed in the print head 42.

In the first circuit 706, if the switch 704 is closed, the upper electrode 506 becomes a cathode and the counter electrode 508 becomes an anode. Accordingly, anions and negative colloidal particles in the ink in the liquid chamber 502 move away from the upper electrode 506 toward the counter electrode 508. In the state where such an electric field is formed, even if the heating resistance element 610 rapidly heats up or heats up repeatedly, the ink components are less likely to adhere to the upper electrode 506, and thus the occurrence of kogation is suppressed.

Further, the upper electrode 506 and the counter electrode 508 are electrically connectable with the second circuit 712 which goes through the power source 708 and the switch 710. Note that, in this second circuit 712, a closed circuit electrically connected by the ink in the liquid chamber 502 is formed. This second circuit 712 removes kogation adhering to the upper electrode 506. For example, the upper electrode 506, the counter electrode 508, and a part of the second circuit 712 are installed in the print head 42, and the remaining parts of the second circuit 712, the switch 710, and the power source 708 are installed outside the print head 42. Note that it is also possible that the switch 710 is installed in the print head 42.

Specifically, in the second circuit 712, if the switch 710 is closed to the a side as in FIG. 7, the current flows from the upper electrode 506 to the counter electrode 508 via the ink in the liquid chamber 502. Accordingly, the upper electrode 506 elutes into the ink, and the kogation adhering to the upper electrode 506 is removed. In the present embodiment, at the time when the print head 42 is performing the printing operation, the control part 52 closes the switch 704 of the circuit 706 and opens the switch 710 of the circuit 712 as the kogation suppression mode. Accordingly, even if the ink components are heated by the heating resistance element 610, the ink components do not adhere to the upper electrode 506 and move toward the counter electrode 508, and thus the occurrence of kogation is suppressed. Further, if ink is ejected by the print head 42 a predetermined number of times so that an anion film is formed on the counter electrode 508, the control part 52 determines that cleaning of the upper electrode 506 is necessary. Further, the control part 52 opens the switch 704 in the circuit 706 and closes the switch 710 in the circuit 712 to the a side as the cleaning process at an appropriate timing while the printing operation is not performed. Accordingly, current flows from the upper electrode 506 to the counter electrode 508, so that the kogation adhering to the upper electrode 506 is removed.

Note that, at the time of the cleaning process for removing kogation, it is also possible that the control part 52 appropriately or periodically turns the switch 710 between the a side and the b side to reverse or repeat reversing the polarities of the upper electrode 506 and the counter electrode 508. Accordingly, adhesion of negatively charged particles to both the upper electrode 506 and the counter electrode 508 can be suppressed.

In a case where the areas and the numbers of arranged upper electrodes 506 and the counter electrodes 508 are different, the control part 52 adjusts the pulse width at the time of reversing the polarities. Specifically, the control part 52 adjusts the above-described pulse width according to the ratio of the total areas of the upper electrode 506 and the counter electrode 508 so that the elution amounts of the iridium layers in the upper electrode 506 and the counter electrode 508 become equal. For example, as in FIG. 5B, in a case where the total area of the counter electrode 508 is smaller than the total area of the upper electrode 506, the control part 52 adjusts the pulse width so that the remaining film amount of the iridium layer in the counter electrode 508 is matched to the remaining film amount of the iridium layer in the upper electrode 506. Accordingly, it is possible to avoid a situation where an electric field for suppressing kogation is not generated during printing, which results in insufficient suppression of kogation, or where current does not flow during the removal of kogation, which results in remaining kogation.

=Circuit for Detecting Disappearance of Electrodes=

Figure 8:
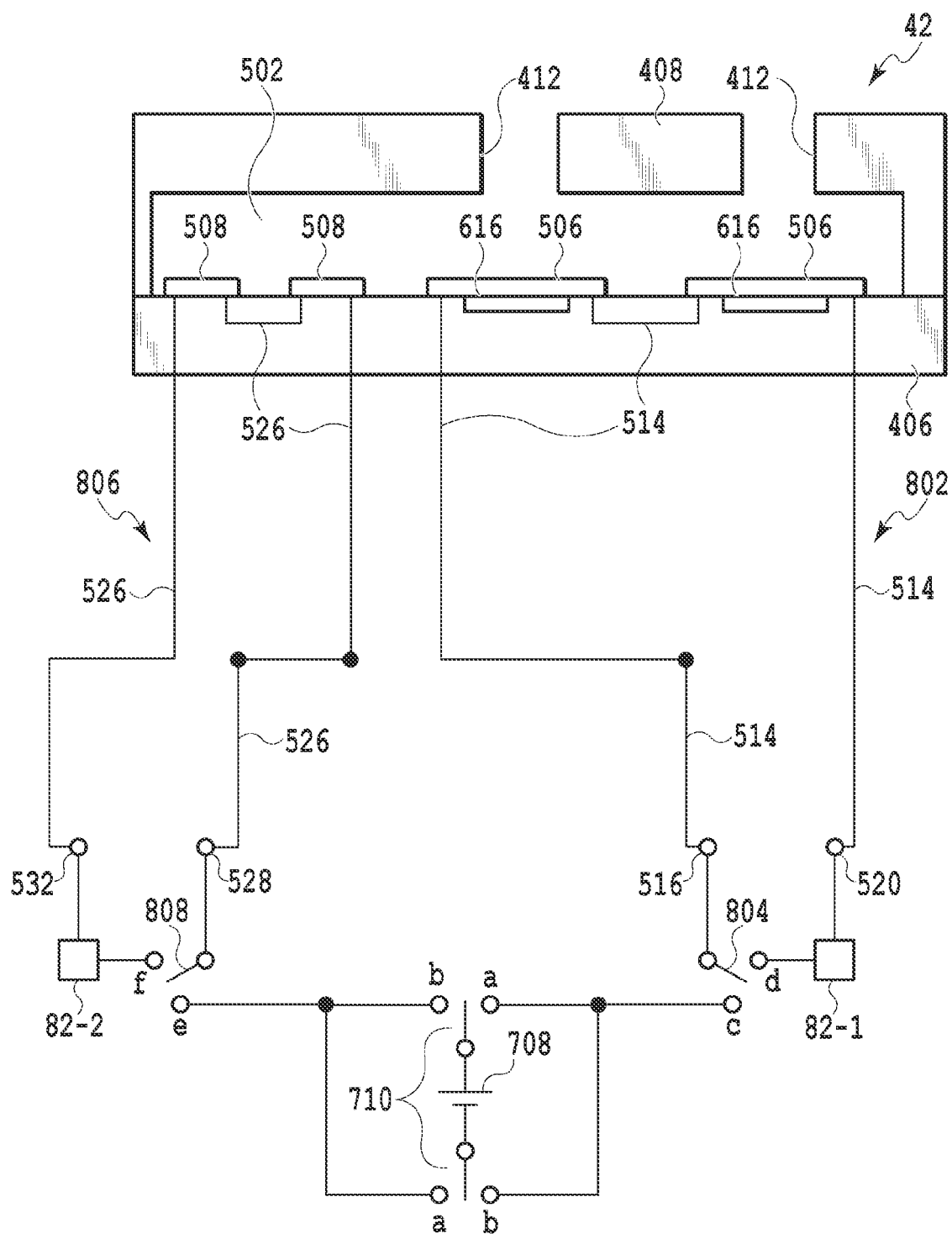
FIG. 8 is a diagram for explaining a circuit capable of detecting disappearance of an upper electrode and a counter electrode.

Next, a circuit configuration for detecting disappearance of the upper electrode 506 and the counter electrode 508 is explained. FIG. 8 is a diagram illustrating the configuration of the circuit capable of detecting disappearance of an upper electrode and a counter electrode. Note that, in the illustration of FIG. 8, a part of the configurations on the base plate 406 is omitted for ease of understanding.

At the point in time when the upper electrode 506 disappears due to elution by cleaning, it becomes impossible to stably form an electric field necessary for suppressing kogation and cleaning. Therefore, it is necessary to detect the timing of disappearance of the upper electrode 506. The print head 42 is equipped with the circuit 802 for detecting the timing of such disappearance of the upper electrode 506.

The multiple upper electrodes 506 function as a part of wiring and form the third circuit 802 together with the terminal 516, the terminal 520, and the common wiring 514 (including the individual wiring 512 and the fuse part 513). The switch 804 is installed in this third circuit 802, and a closed circuit is formed by closing the switch 804 to the d side. Further, the measurement part 82-1 capable of measuring wiring resistance is installed between the terminal 516 and the terminal 520 together with the switch 804 in the third circuit 802.

With an increase in the number of times of cleaning, the elution amount of the upper electrode 506 increases, and, if the upper electrode 506 disappears, the control part 52 determines that a part of the third circuit 802 is cut off, i.e., open circuit, based on the measurement result of the measurement part 82-1. That is, the control part 52 can detect the timing at which the upper electrode 506 disappears according to the measurement result of the measurement part 82-1.

On the other hand, at the point in time when the counter electrode 508 disappears due to elution by a reversed voltage in cleaning, it becomes impossible to stably form an electric field necessary for suppressing kogation and cleaning. Therefore, it is also necessary to detect the timing of disappearance of the counter electrode 508. The print head 42 is equipped with the circuit 806 for detecting the timing of such disappearance of the counter electrode 508.

The multiple counter electrodes 508 function as a part of wiring and form the fourth circuit 806 together with the terminal 528, the terminal 532, and the common wiring 526. The switch 808 is installed in this fourth circuit 806, and a closed circuit is formed by closing the switch 808 to the f side. Further, the measurement part 82-2 capable of measuring wiring resistance is installed between the terminal 528 and the terminal 532 together with the switch 808 in the fourth circuit 806.

With an increase in the number of times of cleaning, the elution amount of the counter electrode 508 increases, and, if the counter electrode 508 disappears, the control part 52 determines that a part of the fourth circuit 806 is cut off, i.e., open circuit, based on the measurement result of the measurement part 82-2. That is, the control part 52 can detect the timing at which the counter electrode 508 disappears according to the measurement result of the measurement part 82-2.

The voltage application conditions during cleaning are set so that elution occurs in an almost uniform manner in the region where the ink and the electrode material are in contact. Therefore, the disappearance timings of the electrode surfaces are almost the same and can be detected as an increase in resistance values. As described above, in the present embodiment, the control part 52 functions as a detection part capable of detecting the degree of elution of the upper electrode 506 and the counter electrode 508 into the ink, based on a measurement result of the measurement part.

The power source 708 and the switch 710 used in the above-described cleaning process are installed so as to be connectable to the upper electrodes 506 via the switch 804. Further, the power source 708 and the switch 710 are installed so as to be connectable to the counter electrodes 508 via the switch 808. For the cleaning process, the switch 710 is closed to the a side, the switch 804 is closed to the c side, and the switch 808 is closed to the e side. Further, as described above, the switch 710 is appropriately or periodically switched between the a side and the b side. Although the present embodiment has a configuration in which the measurement part 82 (the measurement parts 82-1 and 82-2), which serves as the measurement unit, and the switches 804 and 808 are installed outside the print head 42, it is also possible that at least some of them are installed inside the print head 42. That is, in the print head 42, it is only necessary that the circuits 802 and 806 are configured to be capable of measuring the wiring resistance, and thus a part of the members configuring the circuits 802 and 806 may be installed outside the print head 42.

Further, for example, the circuits 802 and 806 include all electrodes (upper electrodes and counter electrodes) connected by common wiring between two terminals. In this case, the wiring resistance including all the electrodes is measured, and thus, if even one electrode disappears, replacement of the head is prompted. Note that, for example, in a case where the elution amounts greatly vary because of the arrangement positions of the electrodes, it is also possible to route the common wiring so that, in the common wiring to which multiple electrodes in the locations where the elution amounts are great are connected, two given locations can be connected to the terminals, respectively. Alternatively, by changing the lead positions (the connection positions of the terminals), i.e., by routing the wiring so that the wiring resistance can be measured by changing multiple electrodes included in the circuit, the position where the electrode has disappeared can be specified from the difference in resistance value. In this case, it is possible to suppress deterioration in printing quality by performing control so that ink is not ejected from the specified position during printing.

Further, although the upper electrode 506 and the counter electrode 508 have the two-layer structure in which an iridium (Ir) layer and a tantalum (Ta) layer are laminated in the above-described explanation, there is not a limitation as such. That is, by forming an adhesion layer (for example, a tantalum layer) under the iridium layer, adhesiveness between the base plate and the iridium layer can be improved. The presence of the adhesion layer is more effective in the case of using a print head intended for high durability in which the film thickness of the iridium layer is thick and stress tends to be large.

In a case where an adhesion layer is installed, since the tantalum used for the adhesion layer is a conductor, even if an electrode layer disappears, current flows through the tantalum of the adhesion layer, and thus there is a concern that the disappearance of the electrode layer may be overlooked. However, if the electrode layer disappears, the tantalum of the adhesion layer comes into contact with the ink and, moreover, acts as an anode due to application of a cleaning voltage. Therefore, oxidation of the tantalum in the adhesion layer proceeds rapidly, and thus the tantalum does not hinder the detection of disappearance of the electrode layer.

Further, it is also possible that the control part 52 monitors whether or not elution is being performed as expected during the cleaning process or predicts the timing of disappearance of the upper electrode 506 and the counter electrode 508. In this case, it is preferable that the resistances of the common wiring 514 (including the individual wiring 512 and the fuse part 513) and the common wiring 526 are made as low as possible in order to accurately measure the resistance changes due to reduction in the film thicknesses of the upper electrode 506 and the counter electrode 508. Specifically, for example, the resistances can be lowered by using the first wiring pattern 606 and the second wiring pattern. Accordingly, it is possible to more accurately detect the degrees of elution of the upper electrode 506 and the counter electrode 508, such as disappearance due to the elution into the ink, the remaining amount after elution, and the amount of elution.

Although the print head 42 is equipped with the circuit 802 for detecting disappearance of the upper electrode 506 and the circuit 806 for detecting disappearance of the counter electrode 508 in the present embodiment, there is not a limitation as such. At the point in time when one of the upper electrode 506 and the counter electrode 508 disappears, the effect of suppressing and removing kogation is lost. Therefore, it is also possible to form the above-described circuit for one of the upper electrode 506 and the counter electrode 508 that disappears at an earlier stage. For example, in a case where the total area of the counter electrode 508 is smaller than the total area of the upper electrode 506, the counter electrode 508 disappears before the upper electrode 506 does. Therefore, in this case, only the fourth circuit 806 is installed without installing the third circuit 802.

(Print Processing)

Figure 9:
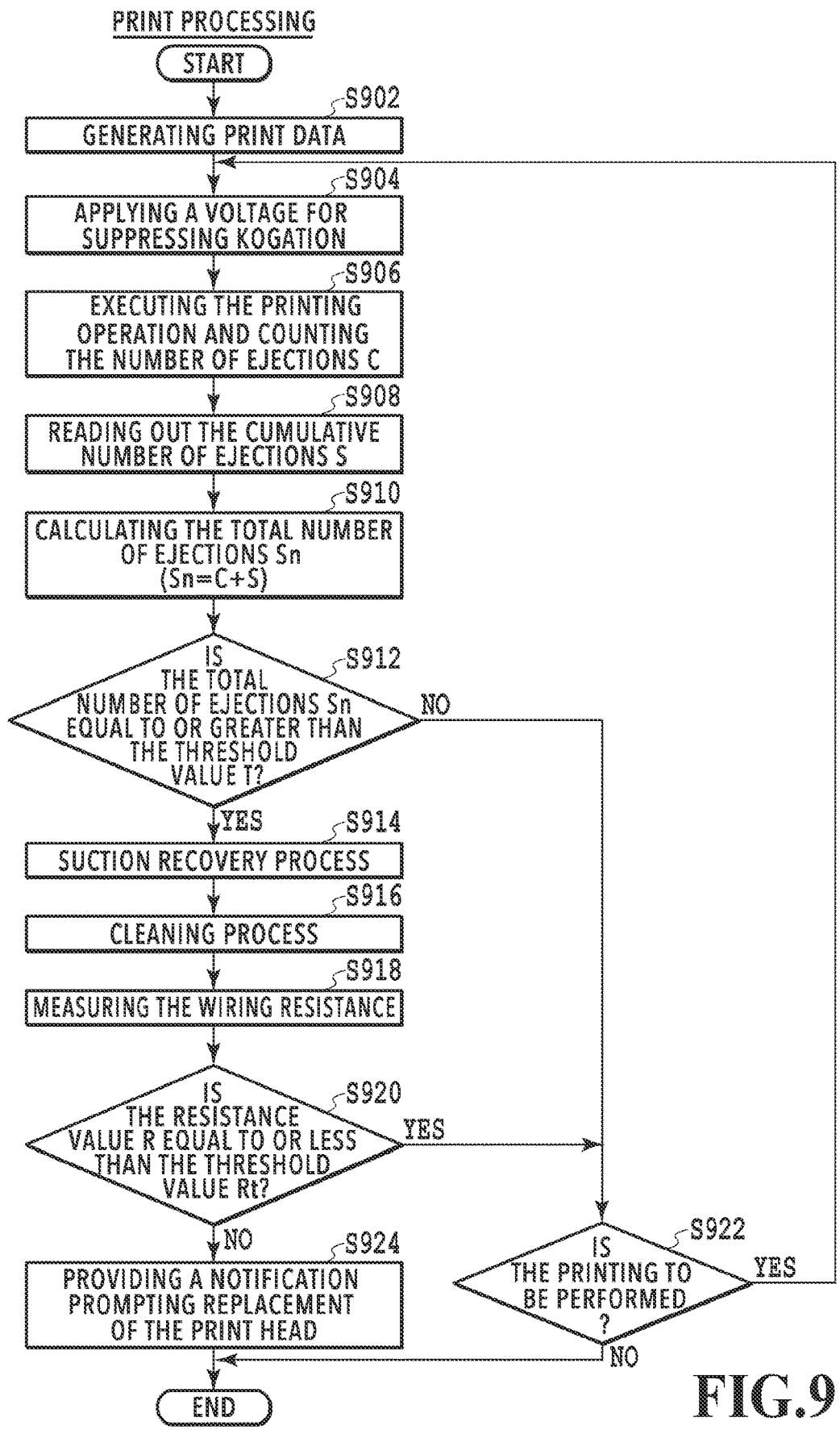
FIG. 9 is a flowchart illustrating details of processing of print processing.

In the above-explained printing apparatus 10, if a print command is input from the host apparatus 50 or the like, the print processing is executed. FIG. 9 is a flowchart illustrating details of processing of the print processing. The series of the processes illustrated in the flowchart of FIG. 9 is performed in the control part 52 with the MPU 54 loading a program code stored in the ROM 56 into the DRAM 58 and executing the program code. Alternatively, a part or all of the functions in the steps of FIG. 9 may be executed by hardware such as an ASIC or an electronic circuit. Note that the sign S in the explanation of each process means that it is a step of the flowchart.

If the print processing is started, first, the MPU 54 loads the image data that is input from the host apparatus 50 or the like via the I/F 48 to the DRAM 58 via the GA 62 and generates print data for controlling ink ejection/non-ejection in the print head 42 (S902). Next, the MPU 54 applies a voltage for suppressing kogation (S904). That is, in S904, the switch 704 is closed and the switch 710 is opened via the electric field adjuster 76, and a voltage is applied from the constant voltage power source 702 with the upper electrode 506 serving as a cathode and the counter electrode 508 serving as an anode.

Thereafter, the MPU 54 executes the printing operation (and the conveyance operation) based on the print data and starts counting the number of ejections C of ink from the print head 42 during the printing operation (S906). The MPU 54 reads out the cumulative number of ejections S which is saved in the DRAM 58 at a timing when, for example, a predetermined amount of printing operation is completed (S908). The cumulative number of ejections S is the total number of times the print head 42 ejects ink. The cumulative number of ejections S is initialized at the timing when the print head 42 is replaced. Further, the cumulative number of ejections S and the number of ejections C counted during the printing operation are added to obtain the total number of ejections Sn (S910). Note that, in S910, the MPU 54 further updates the value of the cumulative number of ejections S, which is saved in the DRAM 58, to the value of the total number of ejections Sn.

Next, the MPU 54 determines whether or not the total number of ejections Sn in S910 is equal to or greater than the threshold value T which is stored in advance (S912). This threshold value T is, for example, the upper limit value of the number of ejections that does not cause unstable ejection of ink in the print head 42 due to kogation adhering to the upper electrode 506 or a value that is smaller than the upper limit value by a predetermined value. The threshold value T as such can be obtained in an experiment according to the type of ink to be used, for example.

If it is determined in S912 that the total number of ejections Sn is not equal to or greater than the threshold value T, the processing proceeds to S922, which is described later. Further, if it is determined in S912 that the total number of ejections Sn is equal to or greater than the threshold value T, the MPU 54 executes the suction recovery process (S914). That is, in S914, the MPU 54 drives the carriage motor 24 via the CR motor driver 64 to move the carriage 14 to the home position. Further, the recovery system motor 74 is driven via the recovery motor driver 72 to bring the cap member 36 into contact with the print head 42 and reduce the pressure inside the cap member 36 by use of the pump 38 so that the ink is forcibly discharged from the ejection port 412.

Further, the MPU 54 executes the cleaning process while executing the suction recovery process (S916). That is, in S916, first, the MPU 54 opens the switch 704 via the electric field adjuster 76, closes the switch 710 to the a side, and maintains this state for a predetermined time period. Accordingly, current flows from the upper electrode 506 to the counter electrode 508 via the ink in the liquid chamber 502. Therefore, the upper electrode 506 elutes into the ink at a certain speed, so that kogation formed on the upper electrode 506 is removed. Note that, in S916, it is also possible to reverse the polarities of the upper electrode 506 and the counter electrode 508 by turning the switch 710 between the a side and the b side at regular intervals.

Kogation formed on the upper electrode 506 is removed by such a suction recovery process and a cleaning process. Further, by the suction recovery process executed during the cleaning process, the ink containing the kogation removed from the upper electrode 506 can be discharged, and new ink can be supplied into the liquid chamber 502. The suction recovery process ends at the timing when the cleaning process ends.

If the cleaning process ends, next, the wiring resistances in the third circuit 802 and the fourth circuit 806 are measured (S918). That is, in S918, the MPU 54 closes the switch 804 to the d side in the third circuit 802 via the electric field adjuster 76, and the wiring resistance is measured by the measurement part 82-1. Further, the switch 808 is closed to the f side in the fourth circuit 806, and the wiring resistance is measured by the measurement part 82-2.

Further, whether or not the resistance value R obtained in S918 is equal to or less than the threshold value Rt is determined (S920). The threshold value Rt is, for example, the lower limit value of resistance value at which it can be determined that the electrodes (the upper electrode 506 and the counter electrode 508) have not disappeared in the circuits or a value that is smaller than the lower limit value by a predetermined value. The threshold value Rt as such can be obtained in an experiment according to the type of ink to be used, for example. That is, in S920, whether or not the kogation on the upper electrode 506 can be removed is determined.

If it is determined in S920 that the resistance value R is equal to or less than the threshold value Rt, whether or not to perform printing again is determined (S922). Further, if it is determined that printing is to be performed, the processing returns to S902, and, if it is determined that printing is not to be performed, this print processing ends. That is, if the resistance value R is equal to or less than the threshold value Rt, the MPU 54 determines that the upper electrode 506 and the counter electrode 508 remain with film thicknesses that do not lose their functions, and thus it is possible to execute subsequent printing.

Further, if it is determined in S920 that the resistance value R is not equal to or less than the threshold value Rt, the MPU 54 provides a notification prompting replacement of the print head 42 (S924) and ends this print processing. That is, if the resistance value R is not equal to or less than the threshold value Rt, that is, if the resistance value R exceeds the threshold value Rt, the MPU 54 determines that the upper electrode 506 and the counter electrode 508 have disappeared to such an extent that their functions are lost, i.e., that the function of removing kogation has been lost, and provides the notification prompting replacement of the print head 42. As described above, in the present embodiment, the control part 52 functions as a notification part that determines the timing for replacement of the print head 42 according to a degree (detection result) of elution of an electrode into ink detected by the measurement part 82 based on the resistance value, for example, and provides a notification prompting replacement of the print head 42. Note that it is also possible that the control part 52 determines the above-described timing, based on the resistance value measured by the measurement part 82, to prompt replacement of the print head 42.

In the present embodiment, in S920, the resistance value R1 measured by the measurement part 82-1 and the resistance value R2 measured by the measurement part 82-2 are each compared with the threshold value Rt. Further, if it is determined that at least one of the resistance values R1 and R2 is equal to or less than the threshold value Rt, the processing proceeds to S924. Note that, as a notification method in S924, various publicly-known techniques, such as displaying on a display part (not illustrated in the drawings) of the host apparatus 50 or the printing apparatus 10, can be used.

Regarding the threshold value Rt, it is also possible to set two different threshold values, i.e., the threshold value Rt1 to be compared with the resistance value R1 of the third circuit 802 including the upper electrode 506 and the threshold value Rt2 to be compared with the resistance value R2 of the fourth circuit 806 including the counter electrode 508. Since the print head 42 can be used even if the counter electrode 508 disappears, the threshold value Rt2 on the counter electrode 508 side can be set to a value that makes open circuit. On the other hand, the upper electrode 506 needs to remain to some extent in order to protect the heating resistance element 610 from cavitation and ink. Therefore, the threshold value Rt1 on the upper electrode 506 side can be set to a value that allows detection of the minimum remaining amount necessary to maintain the above-described function.

As explained above, in the print head 42 of the present embodiment, the third circuit 802 including the upper electrode 506 which protects the heating resistance element 610 and to which kogation due to ink adheres is formed, and the wiring resistance of the third circuit 802 can be measured. Further, the fourth circuit 806 including the counter electrode 508 for suppressing adhesion of kogation to the upper electrode 506 is formed, and the wiring resistance in the fourth circuit 806 can be measured.

Accordingly, in the print head 42, it is possible to detect the timing when the functions of the upper electrode 506 and the counter electrode 508 are lost due to their disappearance, etc. Therefore, it is possible to appropriately detect the timing for replacement of the print head, and thus it is possible to replace the print head 42 at a more appropriate timing. Accordingly, the cost required for replacing the print head 42 can be suppressed.

Verification Experiments

Next, the verification experiments conducted by the inventors of the present application to confirm the effect of the present embodiment are explained. Note that the printing apparatus 10 used in the verification experiments has a configuration in which the tank 40 is removable from the head unit 12 and the print head 42 is fixedly installed on the carriage 14. Further, a pigment cyan ink was used as the ink.

Verification Example 1

=Configuration of the Print Head=

In Verification Example 1, on the base plate 406, a patterning was performed after a 30 nm iridium layer was formed as the protective layer 616 on the insulative layer 614, and a patterning was performed after a 60 nm tantalum layer was formed on the iridium layer. With the protective layer 616 formed in this way, the upper electrodes 506, the counter electrodes 508, the common wiring 514 connecting all the upper electrodes 506 in series, and the common wiring 526 were formed on the base plate 406 as in FIG. 5A. The common wiring 514 was led out so that one end side was connected to the terminal 516 and the other end side was connected to the terminal 520. Note that, here, the total area of the multiple upper electrodes 506 and the total area of the multiple counter electrodes 508 were made to approximately match.

Further, the print head 42 was manufactured by forming the channel forming member 408 on the base plate 406 and forming other necessary terminals, etc. Therefore, Verification Example 1 has such a configuration in which both ends of the common wiring 514 are taken out by the terminal 516 and the terminal 520 and the wiring resistance can be measured by the measurement part 82-1 in the third circuit 802 where all the upper electrodes 506 are a part of the wiring. That is, in this Verification Example 1, the fourth circuit 806 is not formed.

=Cleaning Process=

First, in order to make kogation adhere to the upper electrode 506, a voltage of 1 V was applied between the upper electrodes 506 and the counter electrodes 508 in the second circuit 712 so that the counter electrodes 508 become anodes, and the print head 42 was made to execute ($1 \times 10^9$) ejection operations. The temperature of the print head 42 was adjusted to 50° C. during the ejection operations. After the ejection operations ended, the ink in the liquid chamber 502 was replaced with a clear ink, and, as a result of an observation of the surface condition of the upper electrodes 506, adhesion of kogation on the upper electrodes 506 was confirmed.

Next, after replacing the ink in the liquid chamber 502 with a pigmented cyan ink, the cleaning process was performed while performing the suction recovery process on the print head 42. Specifically, as the cleaning process, a voltage of 5 V was applied between the upper electrodes 506 and the counter electrodes 508 in the second circuit 712 for 60 seconds while reversing the polarities every second.

Thereafter, the switch 804 was closed, and, as a result of measuring the wiring resistance of the third circuit 802 with the measurement part 82-1, it was confirmed that the obtained resistance value R was equal to or less than the threshold value Rt. Further, after the cleaning process, the ink in the liquid chamber 502 was replaced with a clear ink, and, as a result of an observation of the surface condition of the upper electrodes 506, it was confirmed that the kogation that adhered to the upper electrodes 506 had been removed.

Further, the tank 40 was replaced with a new tank 40, and kogation was made to adhere to the upper electrodes 506 by the above-described ejection operations. Thereafter, a series of processing of performing the above-described cleaning process accompanied by the suction recovery process was performed 14 times in total. As a result of observation after the 14th time of the above-described processing, it was confirmed that the kogation was removed from the surfaces of the upper electrodes 506 after the cleaning process. Further, if the printing was performed with replacement of the tank 40 after the 14th time of the above-described processing, the printing quality was almost the same as the time when the printing was performed with the tank 40 that was set for the first time. Further, it was confirmed that the resistance value R of the wiring resistance in the third circuit 802 after the 14th time of the above-described processing was equal to or less than the threshold value Rt, and it was determined that the wiring was not broken.

Subsequently, the above-described processing was performed once more, so that the 15th time of the above-described processing was performed in total. It was confirmed that the resistance value R of the wiring resistance in the third circuit 802 after the 15th time of the above-described processing exceeded the threshold value Rt, and it was determined that the wiring was broken. Thereafter, the ink in the liquid chamber 502 was replaced with a clear ink, and, as a result of observation of all the upper electrodes 506, all the upper electrodes 506 had disappeared. Specifically, the iridium layer of the upper electrodes 506 had disappeared and the underlying insulative layer 614 had been exposed.

Verification Example 2

=Configuration of the Print Head=

In Verification Example 2, on the base plate 406, a patterning was performed after a 30 nm iridium layer was formed as the protective layer 616 on the insulative layer 614, and a patterning was performed after a 60 nm tantalum layer was formed on the iridium layer. With the protective layer 616 formed in this way, the upper electrodes 506, the counter electrodes 508, the common wiring 514, and the common wiring 526 connecting all the counter electrodes 508 were formed on the base plate 406. The common wiring 526 was led out so that one end side was connected to the terminal 528 and the other end side was connected to the terminal 532. Note that, here, one counter electrode 508 is formed so as to correspond to two upper electrodes 506. Further, the ratio of the total area of the upper electrode 506 to the total area of the counter electrode 508 was set to 2:1.

Further, the print head 42 was manufactured by forming the channel forming member 408 on the base plate 406 and forming other necessary terminals, etc. Therefore, Verification Example 2 has such a configuration in which both ends of the common wiring 526 are taken out by the terminal 528 and the terminal 532 and the wiring resistance can be measured by the measurement part 82-2 in the fourth circuit 806 where all the counter electrodes 508 are a part of the wiring. That is, in this Verification Example 2, the third circuit 802 is not formed.

=Cleaning Process=

First, in order to make kogation adhere to the upper electrode 506, a voltage of 1 V was applied between the upper electrodes 506 and the counter electrodes 508 in the second circuit 712 so that the counter electrodes 508 become anodes, and the print head 42 was made to execute ($1 \times 10^9$) ejection operations. The temperature of the print head 42 was adjusted to 50° C. during the ejection operations. After the ejection operations ended, the ink in the liquid chamber 502 was replaced with a clear ink, and, as a result of an observation of the surface condition of the upper electrodes 506, adhesion of kogation on the upper electrodes 506 was confirmed.

Next, after replacing the ink in the liquid chamber 502 with a pigmented cyan ink, the cleaning process was performed while performing the suction recovery process on the print head 42. Specifically, as the cleaning process, a voltage of 5 V was applied between the upper electrodes 506 and the counter electrodes 508 in the second circuit 712 for 60 seconds while reversing the polarities every second.

Thereafter, the switch 808 was closed, and, as a result of measuring the wiring resistance of the fourth circuit 806 with the measurement part 82-2, it was confirmed that the obtained resistance value R was equal to or less than the threshold value Rt. Further, after the cleaning process, the ink in the liquid chamber 502 was replaced with a clear ink, and, as a result of an observation of the surface condition of the upper electrodes 506, it was confirmed that the kogation that adhered to the upper electrodes 506 had been removed.

Further, the tank 40 was replaced with a new tank 40, and kogation was made to adhere to the upper electrodes 506 by the above-described ejection operations. Thereafter, a series of processing of performing the above-described cleaning process accompanied by the suction recovery process was performed 7 times in total. As a result of observation after the 7th time of the above-described processing, it was confirmed that the kogation was removed from the surfaces of the upper electrodes 506 after the cleaning process. Further, if the printing was performed with replacement of the tank 40 after the 7th time of the above-described processing, the printing quality was almost the same as the time when the printing was performed with the tank 40 that was set for the first time. Further, it was confirmed that the resistance value R of the wiring resistance in the fourth circuit 806 after the 7th time of the above-described processing was equal to or less than the threshold value Rt, and it was determined that the wiring was not broken.

Subsequently, the above-described processing was performed once more, so that the 8th time of the above-described processing was performed in total. It was confirmed that the resistance value R of the wiring resistance in the fourth circuit 806 after the 8th time of the above-described processing exceeded the threshold value Rt, and it was determined that the wiring was broken. Thereafter, the ink in the liquid chamber 502 was replaced with a clear ink, and, as a result of observation of all the counter electrodes 508, all the counter electrodes 508 had disappeared. Specifically, the iridium layer of the counter electrodes 508 had disappeared and the underlying insulative layer 614 had been exposed.

As described above, in Verification Examples 1 and 2, it was confirmed that the timing when the resistance value R of the wiring resistance exceeded the threshold value Rt and it was determined that the wiring is broken was the same as the timing when the monitoring target electrodes disappeared.

Comparative Example

=Configuration of the Print Head=

In Comparative Example, on the base plate 406, a patterning was performed after a 70 nm iridium layer was formed as the protective layer 616 on the insulative layer 614, and a patterning was performed after a 60 nm tantalum layer was formed on the iridium layer. With the protective layer 616 formed in this way, the upper electrode 506 and the counter electrode 508 were formed. Further, the print head 42 was manufactured by forming the channel forming member 408 on the base plate 406 and forming other necessary terminals, etc.

Note that the third circuit 802 and the fourth circuit 806 are not installed in Comparative Example. Further, in this print head 42, the number of times of cleaning to be used as an indicator of the timing for replacement of the print head 42 is set to 20 times in consideration of the in-plane distribution of the formed iridium layer and the film thickness distribution in the back-end process.

=Cleaning Process=

As in Verification Example 1, a new tank 40 was set, kogation was made to adhere to the upper electrode 506 by the above-described ejection operations, and a series of processing of performing the above-described cleaning process accompanied by the suction recovery process was performed 20 times in total. The film thickness of the upper electrodes 506 was measured after the 20th time of the above-described processing, and the remaining film thickness was about 30 nm.

As described above, in Comparative Example, it was confirmed that the upper electrodes 506 remained with a film thickness of 30 nm even after reaching the upper limit of the number of times of cleaning that is set as an indicator of the replacement timing of the print head 42. In this case, the print head 42 is replaced even though the cleaning process can still be executed and printing with maintained printing quality can be performed.

On the other hand, in Verification Example 1 and Verification Example 2 according to the present embodiment, the replacement timing of the print head 42 is managed based on measured values of the resistance in the wiring including the electrodes. Therefore, it is not necessary to provide a margin corresponding to manufacturing tolerances that occur in the manufacturing process of the print head 42 to the value for determining the replacement timing of the print head 42. Accordingly, the print head 42 can be replaced at an appropriate timing.

Other Embodiments

Note that the above-described embodiments may be modified as shown in the following (1) through (4).

(1) In the above-described embodiment, although the portions taken out to the terminal 516 and the terminal 520 from the common wiring 514 connecting the upper electrodes 506 are installed at ends in the array direction, there is not a limitation as such. That is, it is also possible that the portions are taken out at given two locations so as to include predetermined multiple upper electrodes 506 which are a part of the installed upper electrodes 506. For example, if a region where the elution rate of the upper electrodes 506 increases is known according to consideration in advance, the portions may be taken out at positions that include the multiple upper electrodes 506 located in the region.

The same is true for the counter electrodes 508. Thus, although the portions taken out to the terminal 528 and the terminal 532 from the common wiring 526 are installed at ends in the array direction, there is not a limitation as such. That is, it is also possible that the portions are taken out at given two locations so as to include predetermined multiple counter electrodes 508 which are a part of the installed counter electrodes 508. For example, if a region where the elution rate of the counter electrodes 508 increases is known according to consideration in advance, the portions may be taken out at positions that include the multiple counter electrodes 508 located in the region.

(2) In the above-described embodiment, although the wiring resistance is measured after the cleaning process in the print processing, there is not a limitation as such. That is, it is also possible that the wiring resistance is measured at a predetermined timing before the print processing is executed. In this case, the film thicknesses of the upper electrodes 506 and the counter electrodes 508 at the start of the print processing can be obtained, and thus it is also possible to calculate the number of times the cleaning process can be executed based on the obtained film thicknesses, in order to use the number as an indicator for determining the timing for replacement of the print head 42. Note that, the above-described predetermined timing is, for example, the timing when the print head 42 is replaced.

(3) The above-described embodiment is not only applied to a printing apparatus that performs printing on a print medium by ejecting ink but can be widely applied as a liquid ejection apparatus that ejects various liquids from a liquid ejection head. Further, in the above-described embodiment, although the printing apparatus 10 is what is termed as a serial-scan type printing apparatus that ejects ink from a print head, which moves in the X direction, onto a print medium, which is conveyed in the Y direction, there is not a limitation as such. That is, what is termed as a full-line type printing apparatus, which uses a long print head extending over the whole area in the width direction of the printing area in a print medium, can be used as well.

(4) The above-described embodiment and various forms shown in (1) through (3) may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-010083, filed Jan. 26, 2022, which is hereby incorporated by reference wherein herein in its entirety.

What is claimed is:

1. A liquid ejection head comprising:
an ejection port configured to eject a liquid stored in a liquid chamber;
an electrothermal conversion element configured to eject the liquid from the ejection port by heat generation;
a first electrode configured to protect the electrothermal conversion element and to be capable of eluting into the liquid by an electrochemical reaction with the liquid;
a second electrode installed so as to be electrically connectable to the first electrode via the liquid; and
a first circuit,
wherein a voltage is applied to cause the second electrode to generate the electrochemical reaction with the first electrode so that the first electrode is eluted into the liquid,
wherein the first circuit is configured to reverse polarities between the first electrode and the second electrode for applying the voltage,
wherein the first circuit comprises a second circuit including a plurality of second electrodes as a part of wiring, and
wherein the second circuit comprises a measuring unit configured to measure wiring resistance and wiring resistance in the second circuit can be measured by the measuring unit.

2. The liquid ejection head according to claim 1, wherein the plurality of second electrodes is connected in series by the wiring in the second circuit.

3. The liquid ejection head according to claim 1, wherein the plurality of second electrodes is connected to the second circuit via individually installed wiring.

4. The liquid ejection head according to claim 1, wherein the plurality of second electrodes includes all the installed second electrodes.

5. The liquid ejection head according to claim 1, wherein the plurality of second electrodes is a part of the installed second electrodes.

6. The liquid ejection head according to claim 5,
wherein, in the second circuit, the plurality of second electrodes can be changed for measuring the wiring resistance.

7. A liquid ejection head comprising:
an ejection port configured to eject a liquid stored in a liquid chamber;
an electrothermal conversion element configured to eject the liquid from the ejection port by heat generation;
a first electrode configured to protect the electrothermal conversion element and to be capable of eluting into the liquid by an electrochemical reaction with the liquid;
a second electrode installed so as to be electrically connectable to the first electrode via the liquid; and
a first circuit,
wherein a voltage is applied to cause the second electrode to generate the electrochemical reaction with the first electrode so that the first electrode is eluted into the liquid,
wherein the first circuit is configured to reverse polarities between the first electrode and the second electrode for applying the voltage,
wherein the first circuit comprises a second circuit including a plurality of first electrodes as a part of wiring, and
wherein the second circuit comprises a measuring unit configured to measure wiring resistance and wiring resistance in the second circuit can be measured by the measuring unit.

8. The liquid ejection head according to claim 7,
wherein the plurality of first electrodes is connected in series by the wiring in the second circuit.

9. The liquid ejection head according to claim 7,
wherein the plurality of first electrodes is connected to the second circuit via individually installed wiring.

10. The liquid ejection head according to claim 7,
wherein the plurality of first electrodes includes all the installed first electrodes.

11. The liquid ejection head according to claim 7,
wherein the plurality of first electrodes is a part of the installed first electrodes.

12. The liquid ejection head according to claim 11,
wherein, in the second circuit, the plurality of first electrodes can be changed for determining the wiring resistance.

13. A cleaning method for a liquid ejection head including:
a first electrode configured to protect an electrothermal conversion element that ejects a liquid in a liquid chamber from an ejection port by heat generation and to be capable of eluting into the liquid by an electrochemical reaction with the liquid;
a second electrode configured to be capable of eluting into the liquid by an electrochemical reaction with the liquid and installed so as to be electrically connectable to the first electrode via the liquid; and
a first circuit,
wherein a voltage is applied to cause the second electrode to generate the electrochemical reaction with the first electrode so that the first electrode is eluted into the liquid, and thus kogation originating from the liquid adhering to the first electrode is removed,
wherein the first circuit is configured to reverse polarities between the first electrode and the second electrode for applying the voltage,
wherein the first circuit comprises a second circuit including at least one of a plurality of first electrodes and a plurality of second electrodes as a part of wiring, and
wherein the second circuit comprises a measuring unit configured to measure wiring resistance and wiring resistance in the second circuit can be measured by the measuring unit,
the cleaning method comprising:
measuring a resistance value in the second circuit; and
determining whether or not kogation on the first electrode can be removed based on the measured resistance value.

* * * * *